(12) United States Patent
Uehara

(10) Patent No.: US 6,380,469 B2
(45) Date of Patent: Apr. 30, 2002

(54) KEYBOARD MUSICAL INSTRUMENT EQUIPPED WITH KEY ACTUATORS ACCURATELY CONTROLLING KEY MOTION

(75) Inventor: Haruki Uehara, Shizuoka (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/886,752

(22) Filed: Jun. 20, 2001

(30) Foreign Application Priority Data

Jun. 21, 2000 (JP) ........................................ 2000-186918

(51) Int. Cl.$^7$ ................................................ G10C 3/12
(52) U.S. Cl. .............................. 84/439; 84/21; 84/236; 84/423 R; 84/720; 84/745; 84/DIG. 7
(58) Field of Search ............................. 84/19–21, 236, 84/423 R, 439, 600, 718–720, 723, 743–745, DIG. 7

(56) References Cited

U.S. PATENT DOCUMENTS

| | | | |
|---|---|---|---|
| 5,824,930 A | * 10/1998 | Ura et al. | 84/462 |
| 5,977,466 A | * 11/1999 | Muramatsu | 84/718 |
| 6,051,762 A | * 4/2000 | Fujiwara et al. | 84/21 |
| 6,229,081 B1 | * 5/2001 | Ura et al. | 84/19 |
| 6,265,647 B1 | * 7/2001 | Tamaki et al. | 84/220 |
| 6,297,437 B1 | * 10/2001 | Ura et al. | 84/423 R |

* cited by examiner

Primary Examiner—Marlon T. Fletcher
(74) Attorney, Agent, or Firm—Morrison & Foerster

(57) ABSTRACT

A keyboard musical instrument is equipped with solenoid-operated key actuators for guiding a player in fingering on the keyboard, and the solenoid-operated key actuators stop the keys at terminative positions on the way to the end positions, wherein key sensors supplies detecting signal representative of the keys reaching the terminative positions to a controller so that the controller removes the driving signals from the solenoid-operated key actuators immediately before the escape of jacks from the hammers.

17 Claims, 6 Drawing Sheets

KEYBOARD MUSICAL INSTRUMENT EQUIPPED WITH KEY ACTUATORS ACCURATELY CONTROLLING KEY MOTION

FIELD OF THE INVENTION

This invention relates to a keyboard musical instrument and, more particularly, to a keyboard musical instrument equipped with key actuators for selectively moving, the keys.

DESCRIPTION OF THE RELATED ART

An array of solenoid-operated key actuators is assembled with an acoustic piano, and a controller selectively energizes the solenoid-operated key actuators for performing a tune without fingering on the keyboard. Thus, the array of solenoid-operated key actuators and the controller serve as an automatic player.

The solenoid-operated key actuators and the controller further behave as a tutor. The controller renders the solenoid-operated key actuators projecting the plungers immediately before times to generate the piano tones in order to notify the keys to be depressed to a trainee. Although the solenoid-operated key actuators fully project the plungers so as to give rise to free rotation of the hammers through escape of the jacks in the automatic playing, the controller is expected to control the solenoid-operated key actuators for stopping the plunger before the free rotation of the hammers in guiding the trainee. The keystroke between the rest position and the escaping point is short. If the keystroke is too short, the key motion may escape trainee's attention. On the other hand, if the keystroke is too long, the hammer unintentionally starts the free rotation. Thus, the accurate key control is required for the electric tutor.

The prior art electric tutor controls the keystroke through adjustment of the time period to energize the solenoid-operated key actuators. The time period is experimentally determined for the solenoid-operated key actuator to be assembled with the acoustic piano. A problem is encountered in the prior art electric tutor in the large amount of time and labor consumed in the experiment. This is because of the fact that the keystroke is different between models of the acoustic piano. The manufacturer needs measuring the keystroke for all the models of the acoustic piano, and takes the electromagnetic characteristics of the solenoid-operated key actuators to be assembled with each model of the acoustic piano into account. The manufacturer decides an appropriate time period for energizing the solenoid-operated key actuators. Thus, the experiment is time-consuming.

Another problem inherent in the prior art electric tutor is aged deterioration of the solenoid-operated key actuators. Even if constant electric power is applied to the solenoid-operated key actuator, the electromagnetic force is gradually decreased. This means that the solenoid-operated key actuators can not move the associated keys to the target positions by the initially adjusted electric power. Finally, the keys are scarcely moved, and the prior art electric tutor is rendered useless.

SUMMARY OF THE INVENTION

It is therefore an important object of the present invention to provide a keyboard musical instrument, key actuators of which are accurately controlled regardless the aged deterioration and the difference in model.

To accomplish the object, the present invention proposes to stop plungers when keys reach predetermined points on the way toward the rest positions.

In accordance with one aspect of the present invention, there is provided a keyboard musical instrument comprising a keyboard having plural keys movable between rest positions and end positions, plural mechanisms connected to the plural keys and selectively actuated by the keys moved from the rest positions to the end positions, plural key actuators having respective moving members associated with the plural keys and movable between retracted positions and projected positions for moving the plural keys from the rest positions to the end positions, plural key sensors associated with the plural keys for detecting transit of terminative points on the way between the rest positions and the end positions for producing detecting signals and a controller connected to the plural key actuators and the plural key sensors, selectively activating the plural key actuators so as to move the moving members from the retracted position toward the projected positions and responsive to the detecting signals for stopping the moving members at intermediate positions on the way to the projected positions.

BRIEF DESCRIPTION OF THE DRAWINGS

The features and advantages of the keyboard musical instrument will be more clearly understood from the following description taken in conjunction with the accompanying drawings in which.

DESCRIPTION OF THE PREFERRED EMBODIMENTS

First Embodiment

Figure 1:
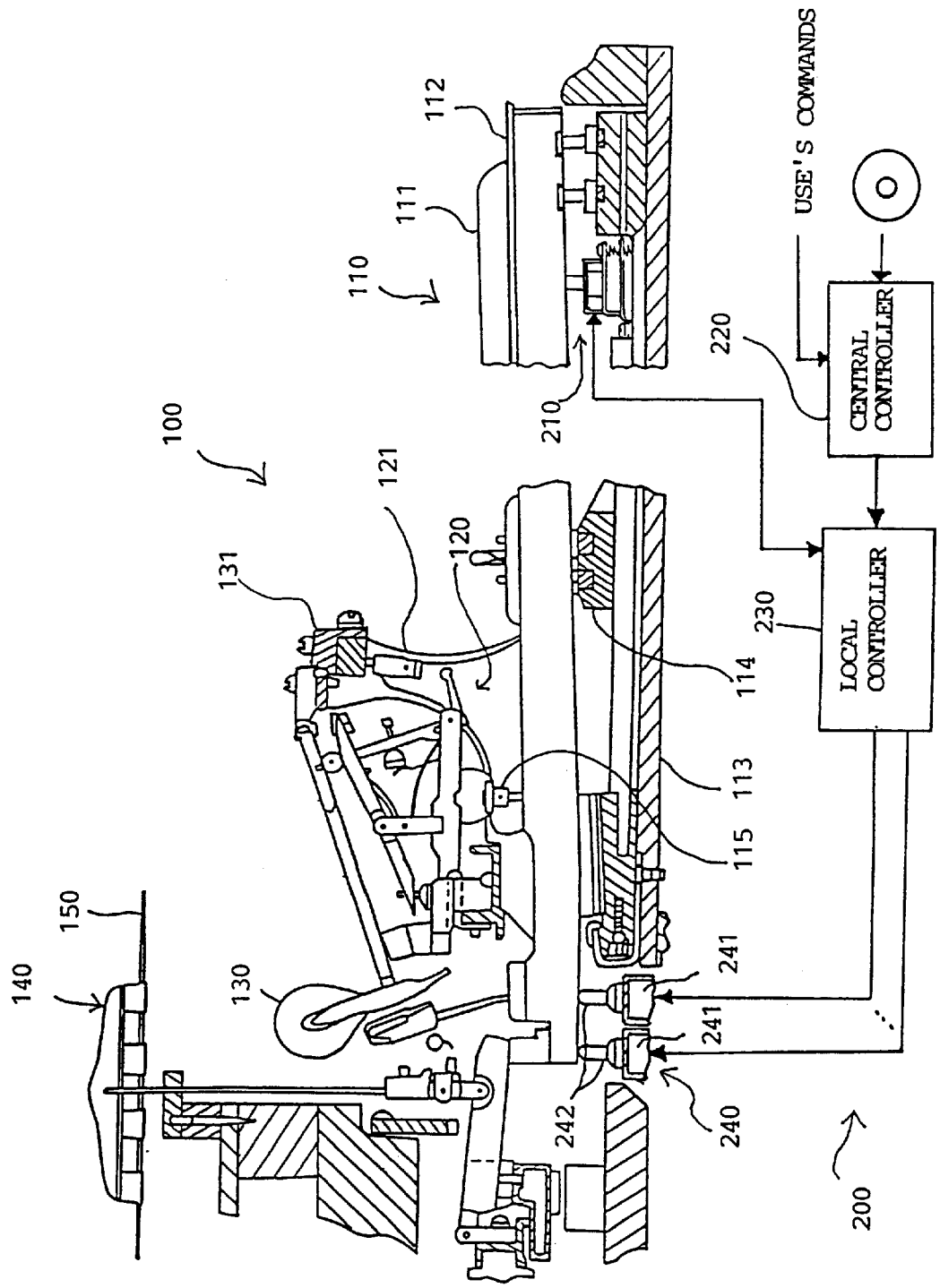
FIG. 1 is a side view showing the structure of a keyboard musical instrument according to the present invention.

Referring to FIG. 1 of the drawings, a keyboard musical instrument embodying the present invention largely comprises an acoustic piano 100 and an electronic system 200. A grand piano is used as the acoustic piano 100, and the electronic system 200 behaves as an automatic player and an electric tutor. Thus, the keyboard musical instrument has at least an acoustic playing mode, an automatic player mode, an electric tutor mode and a composite mode. A human pianist plays a tune on the acoustic piano 100 in the acoustic playing mode. In the composite mode, the electronic system 200 guides a trainee in the fingering for a melody, and accompanies the trainee without fingering. Of course, the keyboard musical instrument permits the trainee and the automatic player to exchange their positions in the composite mode. In the following description, word "front" is indicative of a position closer to a human pianist who is playing the acoustic piano 100 than a "rear position". Word "lateral" is indicative of a direction perpendicular to the fore-and-aft direction passing through a front position and an associated rear position.

The acoustic piano 100 is broken down into a keyboard 110, action mechanisms 120, hammer assemblies 130, dampers 140, sets of strings 150 and a pedal mechanism (not shown). Black keys 111 and white keys 112 are arranged in the lateral direction, and form in combination the keyboard 110. The keyboard 110 is mounted on a key bed 113 and the black/white keys 111/112 are rotatable around a balance rail 114. Notes of a scale are assigned to the black/white keys 111/112, respectively.

The action mechanisms 120 are provided over the associated black/white keys 111/112, and are supported by action brackets 121. The black/white keys 111/112 are connected at capstan buttons 115 to the associated action mechanisms 120, respectively. The hammer assemblies 130 are rotatably supported by a shank flange rail 131, which in turn is supported by the action brackets 121. The sets of strings 150 are stretched over the hammer assemblies 130, and are to be struck with the associated hammer assemblies 130. The dampers 140 are provided at the back of the keyboard 110, and are actuated by the associated black/white keys 111/112. The dampers 140 are held in contact with and spaced from the associated sets of strings 150 so as to permit the associated sets of strings to vibrate while the associated black/white keys 112/111 is moved from or to the rest positions.

Assuming now that a white key 112 starts from the rest position toward the end position, the white key 112 actuates the associated action mechanism 120, and spaces the associated damper 140 from the set of strings 150. The set of strings 150 gets ready to vibrate. The action mechanism 120 slowly rotates the associated hammer 130, and escapes from the hammer 130. The escape gives rise to free rotation of the hammer 130, and the hammer 130 strikes the associated set of strings 140. The hammer 130 rebounds on the set of strings 150. When the white key 112 is released, the white key 112 starts to return to the rest position. The released key 112 allows the damper 140 to be brought into contact with the set of strings 150 on the way toward the rest position, and the damper 140 absorbs the vibrations of the strings 150. The hammer 130 is brought into contact with the associated action mechanism 120 before the released key 112 reaches the rest position.

The electronic system 200 includes key sensors 210, a central controller 220, a local controller 230 and an array of solenoid-operated key actuators 240. The key sensors 210 are provided under the black/white keys 111/112, and monitors the black/white keys 111/112, respectively. The key sensors 210 supply key position signals representative of current key positions to the local controller 230. In this instance, the key sensor 210 detects the key 111/112 in transiting at least three points on the trajectory. Each black/white key 111/112 passes one of the three points immediately before the escape of the associated action mechanism 120, and attracts trainee's attention to the key 111/112 to be depressed. The point immediately before the escape is herein-below referred to as "terminative point". Thus, the key sensor 210 detects the black/white key 111/112 at terminative the point immediately before the escape for the electric tutor. It is desirable that the terminative point is as close to the escaping point as possible. Downward key motion and upward key motion, which are corresponding to note-on and note-off, respectively, are detected at the other two points by the key sensor for the automatic player. For this reason, the other two points are hereinbelow referred to as "note-on point" and "note-off point", respectively. In general, it is desirable to reduce the amount of data information at the interface between a data processor and sensors. From this viewpoint, when the keyboard musical instrument is changed to the electric tutor mode or the composite mode, the local controller 230 fetches the key position signal or signals output from selected one or ones of the key sensors 210 associated with the black/white keys 111/112 to be moved for guiding. The key sensor 210 may be implemented by the combination of a shutter plate and three photo-couplers at the three positions on the trajectory of the shutter plate. The photo-coupler for detecting the terminative point does not require a high resolution.

The solenoid-operated key actuators 240 are provided in a slot formed in the key bed 113. The slot is located under the rear portions of the black/white keys 111/112, and, accordingly, is laterally elongated. The solenoid-operated key actuators 240 are arranged in staggered manner in the slot, and are respectively associated with the black/white keys 111/112. Each solenoid-operated key actuator 240 includes a bobbin (not shown), a coil 241 wound on the bobbin, a plunger 242 projectable from and retractable into the bobbin and a return spring for retracting the plunger 242 into the bobbin. The plungers 242 are aligned with the rear portions of the associated black/white keys 111/112, respectively. The coils 241 are electrically connected in parallel to the local controller 230 through driver circuits. The local controller 230 instructs the driver circuits selectively to supply driving current signals to the coils 241. While the electronic system is playing a tune on the keyboard 110, i.e., behaving as the automatic player, the driving current signal renders the coils 241 widely projecting the plungers 242 so as to give rise to the escape between the action mechanisms 120 and the hammer assemblies 130. On the other hand, while the electronic system 200 is serving as the electric tutor, the driving current signal makes the solenoid-operated key actuators 240 stop the key motion before the escape.

The central controller 220 includes a data processor, a program memory, a working memory, a disc driver/controller, an internal bus system and an interface. The data processor, the program memory, the working memory, the disc driver/controller and the interface are connected to the internal bus system, and the data processor is communicable with the other components. Computer programs for the automatic player and the electric tutor are stored in the program memory, and selectively run on the data processor. A suitable information storage medium such as, for example, a compact disk or a floppy disc are loaded into the disc driver/controller, and a set of music data codes representative of a performance is directly transferred from the information storage medium through the disc driven controller to the working memory. The music data codes may be formatted in accordance with the MIDI (Musical Instrument Digital Interface) standards. The interface is connected to a command source such as, for example, a switchboard or a touch-sensitive panel, a public communication network for the internet and the local controller 230.

The music data codes contain pieces of music data information representative of a performance. The pieces of music data information are grouped by the key motions in the original performance. A piece of music data information represents at least a key code assigned to one of the black/white keys 111/112, note-on, a lapse of time between an initiation of playback and the key motion and a key velocity or the loudness of tone to be produced. Another piece of music data information represents the key code, note-off, a lapse of time between the initiation and the key motion.

While the electronic system 200 is serving as the automatic player, the main controller 220 supplies each croup of music data codes representative of the note-on or note off to the local controller at the expiry of the lapse of time. The local controller 230 selectively supplies the driving current signals to the solenoid-operated key actuators 240. The solenoid-operated key actuators 240 give rise to the downward/upward motion of the associated black/white keys 111/112, and the key sensors 210 notify the transit of the note-on/note-off points to the local controller 230. Thus, the local controller 230, the solenoid-operated key actuators 240 and the key sensors 210 form a control loop so as to reproduce the acoustic tones faithfully.

The electronic system 200 further behaves as the electric tutor. The behavior will be hereinlater described in detail. The keyboard musical instrument has the composite mode where the electronic system 200 serves as the tutor as well as the automatic player. In the composite mode, the central controller 220 attaches a discriminative tag representative of the automatic player or the tutor to each of the music data codes representative of the key code, and makes the local controller 230 discriminate the two kinds of music data codes. If the music data codes are formatted in accordance with the MIDI standards, the music data codes for the tutor are assigned a channel different from that of the music data codes for the automatic player.

Figure 2:
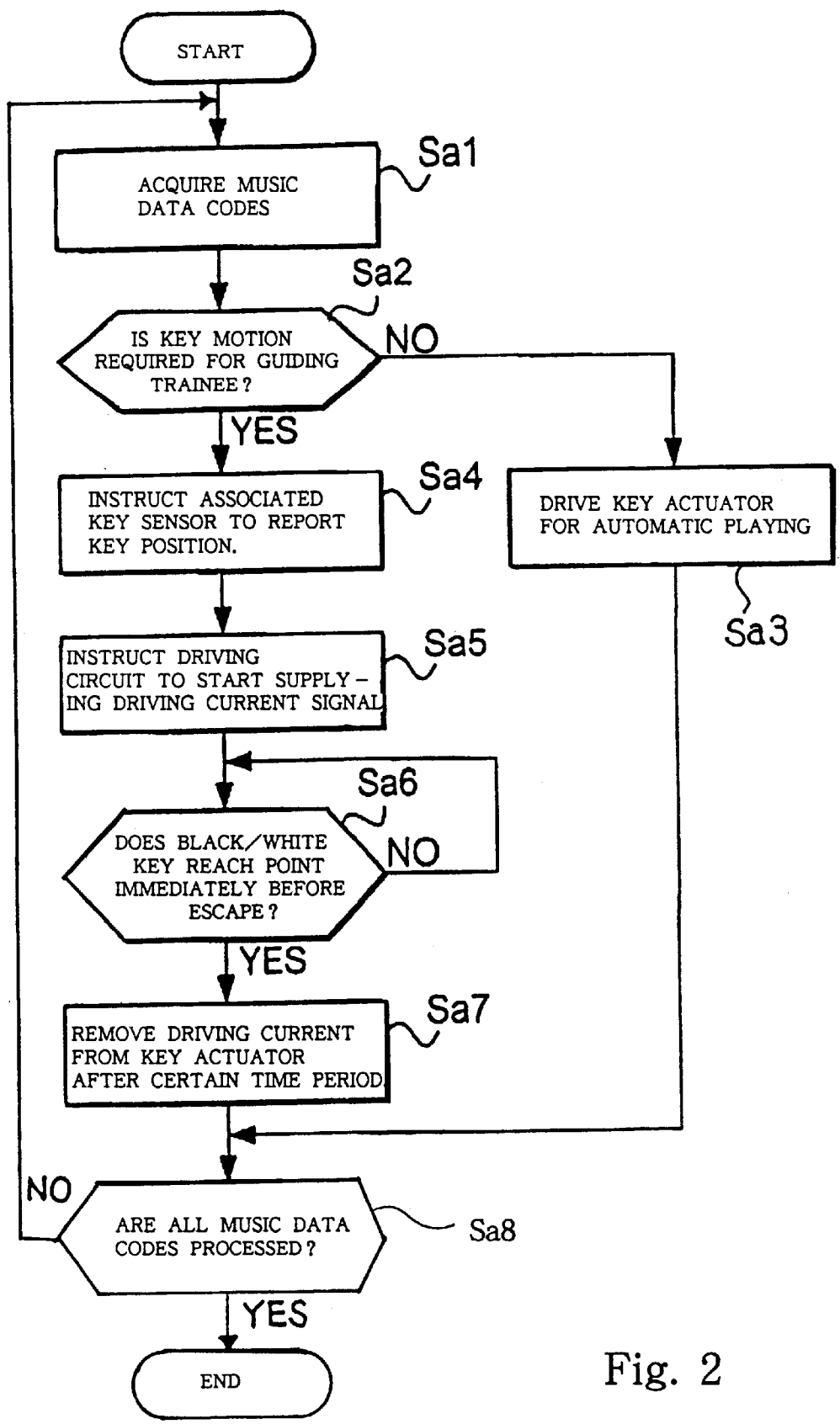
FIG. 2 is a flowchart showing a control sequence achieved by a local controller in an electric tutor mode.

The local controller 230 has a data processing capability as similar to the central controller 220. FIG. 2 shows a control sequence realized by the local controller 230. When a user instructs the keyboard musical instrument to enter the automatic playing mode, the electric tutor mode or the composite mode, the local controller 230 starts the control sequence, and waits for the first music data code supplied from the central controller 220. In the following description, a trainee is assumed to instruct the composite mode to the keyboard musical instrument, and the electronic system 200 guides the trainee in fingering and offers the accompaniment through the automatic playing.

When the time for the first acoustic tone comes, the central controller 220 supplies the music data codes representative of the key code, the note-on and the loudness to the local controller 230. Thus, the local controller 230 acquires the music data codes as by step Sa1. The local controller 230 checks the music data code to see whether or not the key motion is required for guiding a trainee in fingering as by step Sa2.

When the music data codes are to be directed to the automatic player, the answer at step Sa2 is given negative, and the local controller 230 proceeds to step Sa3. The local controller 230 determines the key velocity required for reproducing the piano tone at the given loudness, and instructs a waveform of the driving current signal to the driving circuit associated with the black/white key 111/112 assigned the key code. The driving circuit tailors the driving current signal to the given waveform, and supplies the driving current signal to the coil 241 of the solenoid-operated key actuator 240 associated with the black/white key 111/112. The driving current signal passing through the coil 241 creates electromagnetic field, and the electromagnetic force is exerted on the plunger 242. The plunger 242 projects from the bobbin, and pushes the rear portion of the black/white key 111/112 upwardly. The black/white key 111/112 thus moved by the solenoid-operated key actuator 240 actuates the action mechanism 120, and causes the damper 140 to be spaced from the set of strings 150. The action mechanism 120 gives rise to the free rotation of the hammer assembly 130 through the escape, and the hammer assembly 130 strikes the set of strings 150. The impact of the hanmer assembly 130 gives rise to vibrations of the strings 150, and the piano tone is radiated from the set of strings. The solenoid-operated key actuator 240 keeps the plunger 242 projecting from the bobbin.

When the local controller 230 receives the music data codes representative of the note-off for the same key, the local controller 230 instructs the driving circuit to remove the driving current signal from the solenoid-operated key actuator 240. Then, the plunger 242 is retracted into the bobbin, and the black/white key 111/112 returns to the rest position. Accordingly, the other component parts return to the rest positions, respectively.

On the other hand, when the music data codes are directed to the electric tutor, the answer at step Sa2 is given affirmative. With the positive answer, the local controller 230 specifies the key sensor 210 associated with the black/white key 111/112 to be moved, and instructs the key sensor 210 to report the key position through the key position signal as by step Sa4.

Subsequently, the local controller 230 determines a waveform of the driving current signal to be supplied to the associate solenoid-operated key actuator 240, and instructs the driving circuit to start supplying the driving current signal tailored to the waveform as by step SaS. The plunger starts projecting from the bobbin, and, accordingly, the black/white key begins to rotate. The black/white key 111/112 is getting closer to the terminative point immediately before the escape.

While the solenoid-operated key actuator 240 is projecting the plunger 242, the local controller 230 periodically checks the key position signal to see whether or not the black/white key 111/112 reaches the terminative point immediately before the escape as by step Sa6. While the black/white key 111/112 is advancing to the terminative point, the answer at step Sa6 is given negative, and the local controller 230 repeats step Sa6.

When the black/white key 111/112 reaches the terminative point, the key sensor 210 supplies the key position signal indicative of the transit of the terminative point to the local controller 230, and the answer at step Sa6 is changed to the positive answer. With the positive answer, the local controller 230 starts a counter, and waits for the expiry of a certain time period. Upon expiry of the certain time period, the local controller 230 instructs the associated driving circuit to stop the driving current signal through the control signal as by step Sa7. The driving circuit recovers the driving current signal to zero, and the plunger 242 is retracted into the bobbin due to the elastic force of the return spring (not shown) incorporated in the solenoid-operated key actuator 240. The certain time period may range from zero to a finite length immediately before the time at which the trainee is to depress the black/white key 111/112. The black/white key 111/112 starts to return from the terminative point to the rest position, and, accordingly, the action mechanism 120 returns to the rest position without escape.

Upon completion of the guide, the local controller 230 checks the interface to the central controller 220 to see whether or not all the music data codes have been processed as by step Sa8. If the music data code representative of the termination of the performance has not reached the interface, the answer at step Sa7 is given negative, and the local controller 230 returns to step Sa1. Thus, the local controller 230 reiterates the loop consisting of steps Sa1 to Sa8 so as to guide the trainee in the fingering and selectively move the black/white keys 111/112 for the accompaniment.

When the music data code at the interface is representative of the termination of the performance, the answer at step Sa8 is given affirmative, and the local controller 230 terminates the guide in fingering and the accompaniment.

Figure 3:
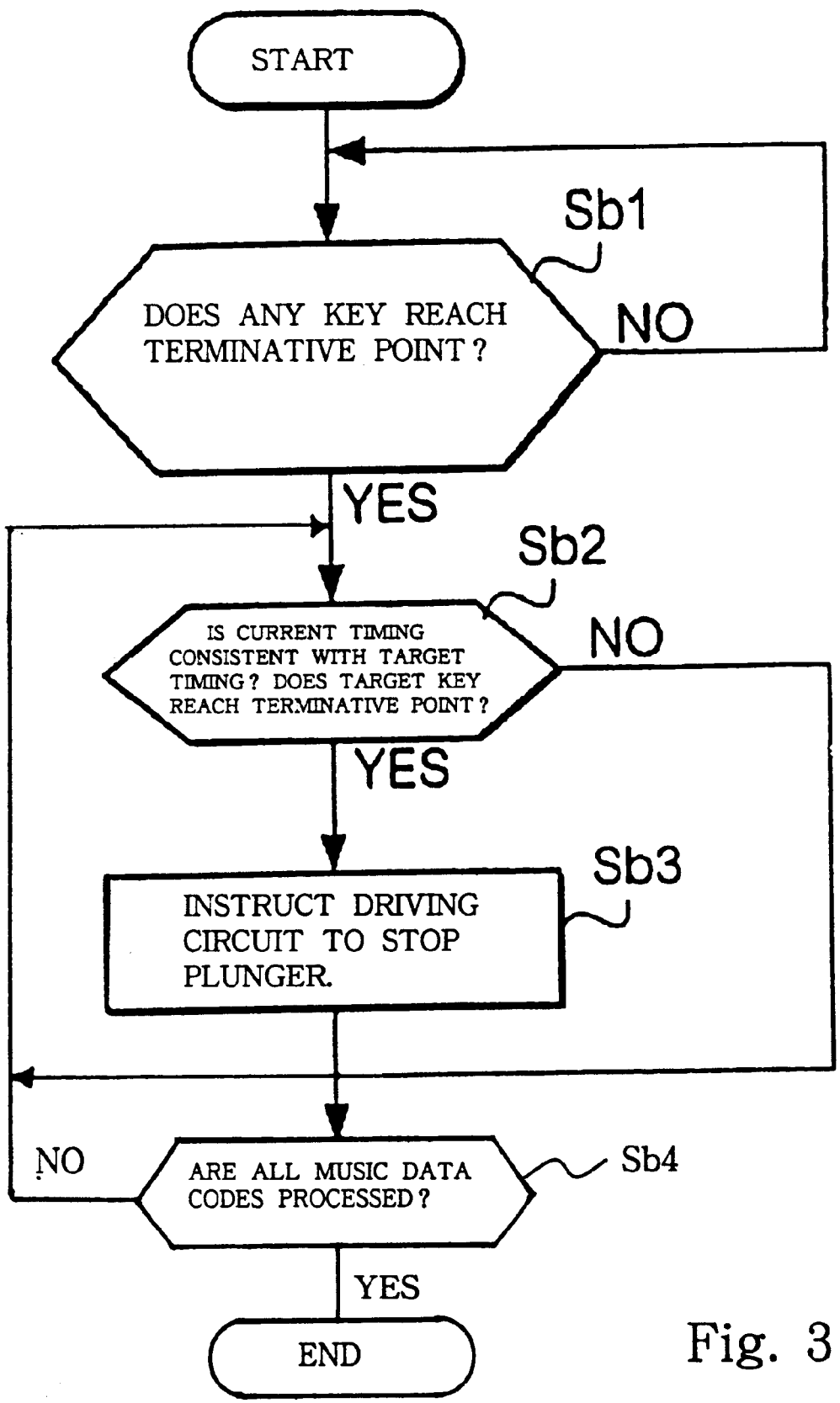
FIG. 3 is a flowchart showing a signal processing for key position signals carried out by the local controller.

As described hereinbefore, the local controller 230 selectively processes the key position signal or signals output from selected one or ones of the key sensor or sensors 210 for the electric tutor. The key sensor system, i.e., the combination of the key sensors 210 and the local controller 230 processes the key position signals as shown in FIG. 3.

When the keyboard musical instrument enters the electric tutor mode or the composite mode, the key sensor system starts the loop consisting of steps Sb1 to Sb4. The key sensors 210 checks the photo-couplers positioned at the target positions to see whether or not the associated black/white keys 111/112 interrupt the light beams of the photo-couplers as by step Sb1. While any black/white key 111/112 does not interrupt the light beam, the answer at step Sb1 is given negative, and the key sensors 210 repeat step Sb1. The key sensors 210 do not change the key position signals. When a black/white key 111/112 reaches the terminative point, the answer at step Sb1 is given affirmative, and the key sensor 210 changes the key position signal. The key position signal is supplied from the key sensor 210 to the local controller 230. Thus, the key sensors 210 repeatedly check the photo-couplers for the associated black/white keys 111/112, and decides the current key positions independently of the local controller 230.

On the other hand, the local controller 230 periodically checks the interface assigned for a music data code representative of a black/white 111/112 key to be moved for guiding the trainee. The black/white key 111/112 to be moved for guiding the trainee is hereinbelow referred to as "target key".

Another interface of the local controller 230 is shared among the key sensors 210 for receiving the key position signals representative of the terminative points. The interface is sequentially assigned to the key sensors 210, and the assignment is repeated at regular time intervals. In other words, the local controller 230 assigns individual timings in a scanning cycle to the key sensors 210, and repeats the scanning cycle at the regular time intervals. The timing assigned to the target key is hereinbelow referred to as "target timing". On the other hand, the timing at which the interface is presently assigned to a certain key sensor 210 is hereinbelow referred to as "current timing". The current timing is changed from a timing to the next timing defined in the scanning cycle, and is stored in another internal register of the local controller 230.

When the music data code reaches the interface, the local controller 230 analyzes the music data code, and determines the target key and, accordingly, the target timing. The target timing is stored in an internal register incorporated in the local controller 230. The local controller 230 instructs the driving circuit to energize the solenoid-operated key actuator 240 assigned to the target key. The solenoid-operated key actuator 240 starts to project the plunger 242 upwardly.

The local controller 230 checks the internal registers to see whether or not the current timing is consistent with the target timing as by step Sb2. While the interface is being assigned to the key sensor 210 different from that associated with the target key, the current timing is inconsistent with the target timing, and the answer at step Sb2 is immediately given negative. With the negative answer, the local controller 230 repeats step Sb2.

When the interface is assigned to the key sensor 210 associated with the target key, the current timing is consistent with the target timing. Then, the local controller 230 fetches the piece of data information representative of the current key position, and checks it to see whether or not the target key reaches the terminative point. If the target key is still on the way to the terminative point, the answer is given negative, and the local controller 230 repeats step Sb2 without execution of step Sb3. When the target key reaches the terminative point, the answer is given affirmative, and the local controller 230 proceeds to step Sb3. Thus, the local controller 230 fetches the piece of data information only when the interface is assigned to the key sensor 210 associated with the target key. This results in reduction of data processing.

With the positive answers at step Sb2, the local controller 230 responds to the key position signal representative of the transit of the terminative point, and instructs the driving circuit to stop cause the solenoid-operated key actuator 240 to stop the plunger 242 as by step Sb3. The driving current signal is decayed, and the solenoid-operated key actuator 240 stops the plunger. If the certain time period is zero, the driving circuit reduces the driving signal to zero, and the solenoid-operated key actuator 240 retracts the plunger 242 into the bobbin.

Upon completion of the job at step Sb3, the local controller 230 proceeds to step Sb4. The local controller 230 checks the interface assigned to the central controller 220 to see whether or not all the music data codes have been processed. If there remains other music data codes, the answer at step Sb4 is given negative. The local controller 230 determines the next target key, and stores a new target timing in the internal register. Thereafter, the local controller 230 returns to step Sb1, and waits for a key position signal representative of the transit of the terminative point.

As will be understood, the key sensors 210 are shared between the automatic player and the electric tutor, and the local controller 230 stops the plungers 242 when the black/white keys 111/112 reach the terminative points. Even though the acoustic pianos 100 are different in model, the manufacturer can install the electronic system 200 in the acoustic pianos without the experiments.

Figure 4:
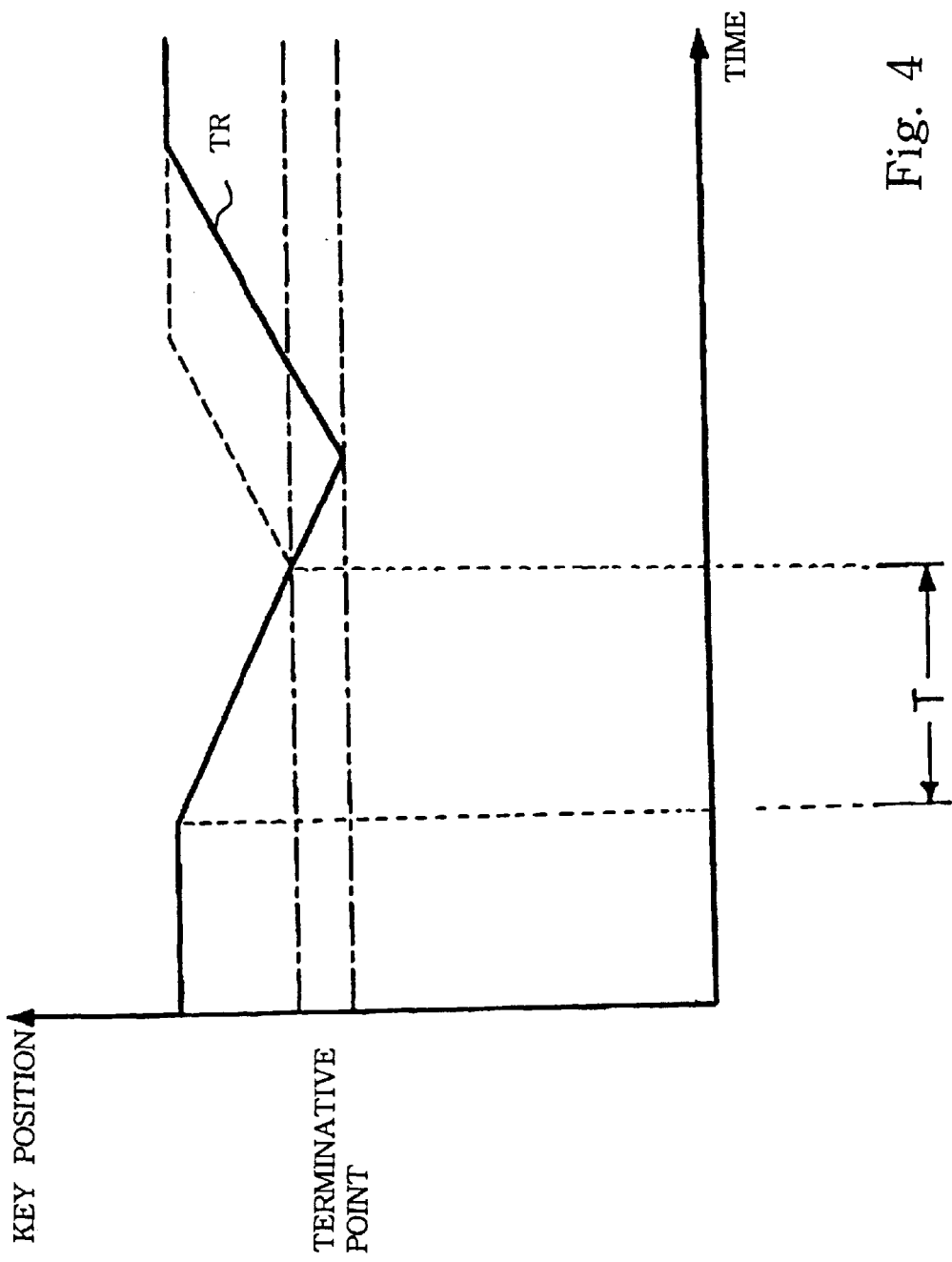
FIG. 4 is a diagram showing a key motion achieved an electronic system as well as in the prior art electronic system.

Although the solenoid-operated key actuators 240 are deteriorated, the coils 241 are continuously energized until the associated black/white keys 111/112 reach the terminative points. In other words, the aged deterioration has no influence on the keystroke. As described hereinbefore, the prior art solenoid operated key actuators are energized for the constant time period T (see FIG. 4). Even through the time period T is appropriate for the prior art solenoid-operated key actuators immediately after the delivery to a user, the time period T is too short after the aged deterioration, and the associated black/white keys merely reach points before the terminative points. However, the local controller 230 according to the present invention makes the driving circuit energize the solenoid-operated key actuators 240 until the terminative points regardless of the lapse of time. This results in that the black/white keys 111/112 surely reach the terminative points after the aged deterioration as indicated by plots TR.

The local controller 230 specifies the black/white key to be moved for guiding a trainee in fingering, and processes the piece of data information representative of the transit of the terminative point for the target key. The amount of data processing is surely reduced.

Second Embodiment

Figure 5:
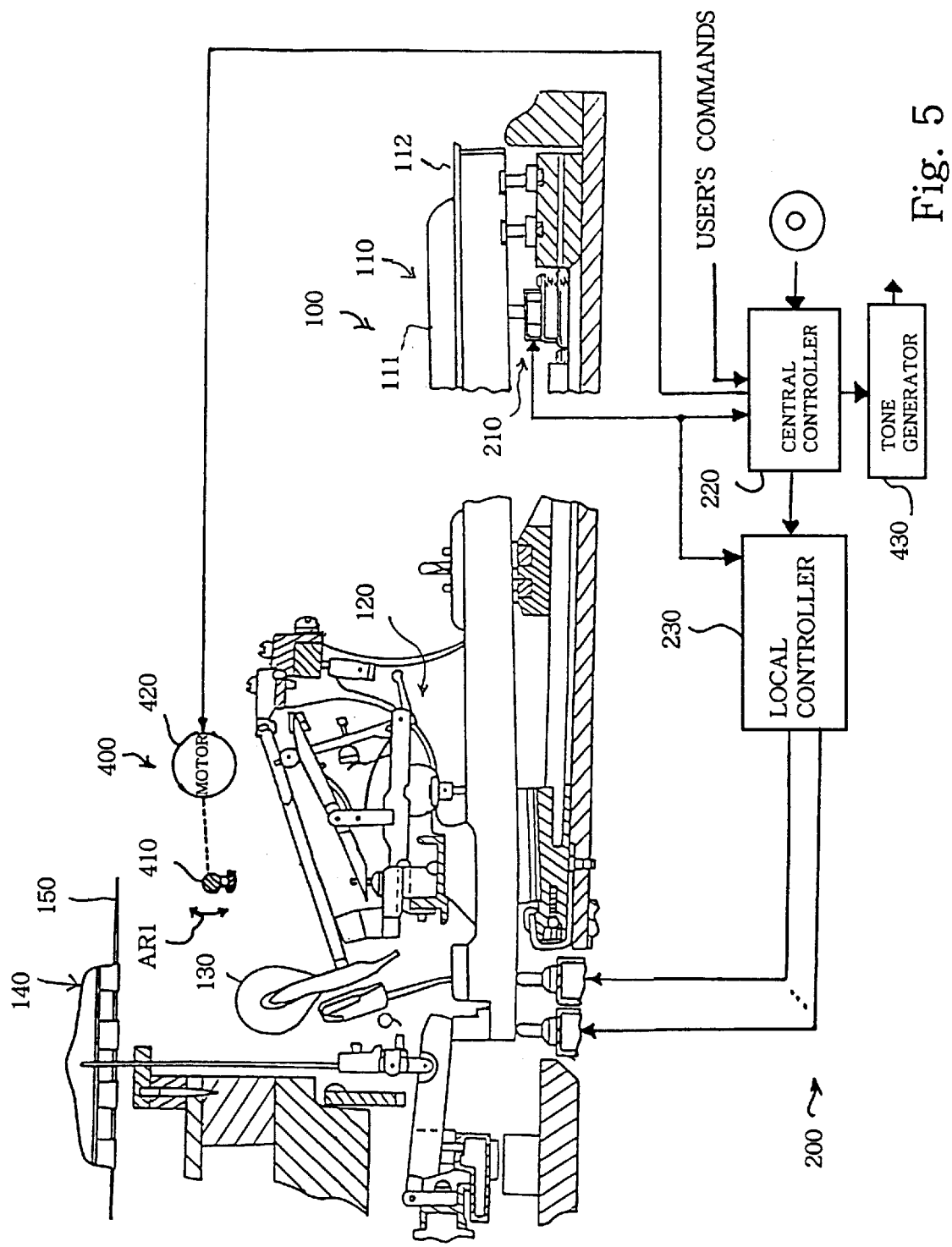
FIG. 5 is a side view showing the structure of another keyboard musical instrument according to the present invention.

Turning to FIG. 5 of the drawings, another keyboard musical instrument embodying the present invention is equipped with a silent system 400. The keyboard musical instrument further comprises an acoustic piano 100 and an electronic system 200 as similar to the keyboard musical instrument implementing the first embodiment. The acoustic piano and the electronic system are similar to those of the first embodiment. For this reason, the components are labeled with the references designating corresponding parts of those incorporated in the first embodiment without detailed description.

The silent system 400 includes a hammer stopper 410, an electric motor 420, a tone generator 430 and a sound system (not shown). The hammer stopper 410 laterally extends in the space between the hammer assemblies 130 and the sets of strings 150, and is rotatable between a free position and a blocking position by means of the electric motor 420. The electric motor 420 is connected to the central controller 220, and bidirectionally rotates the hammer stopper 410 as indicated by arrow AR1. While the hammer stopper 410 is staying at the free position, the hammer stopper 410 is out of the trajectories of the hammer assemblies 130, and the hammer assemblies 130 strike the sets of strings 150 without any interruption of the hammer stopper 410. When the hammer stopper 410 is changed to the blocking position, the hammer stopper 410 enters the trajectories of the hammer assemblies 130. A pianist is assumed to depress the black/white keys 111/112. The depressed black/white keys 111/112 actuate the associated action mechanisms 120, and the hammer assemblies 130 is driven for free rotation after the escape. However, the hammer assemblies 130 rebound on the hammer stopper 410 before striking the strings 150. For this reason, any piano tone is not generated. Nevertheless, the central controller 220 receives the key position signals, and specifies the depressed black/white keys 111/112, and calculates the key velocity. The central controller 220 produces music data codes representative of the key motion, and supplies the music data codes to the tone generator 430. The tone generator 430 produces an audio signal from the music data codes, and supplies it to the sound system. The sound system, which includes a headphone, produces electronic tones instead of the piano tones. Thus, the keyboard musical instrument has the acoustic playing mode, the automatic playing mode, the electric tutor mode, the composite mode and the silent playing mode.

The electronic system 200 achieves all the advantages of the first embodiment.

Third Embodiment

Figure 6:
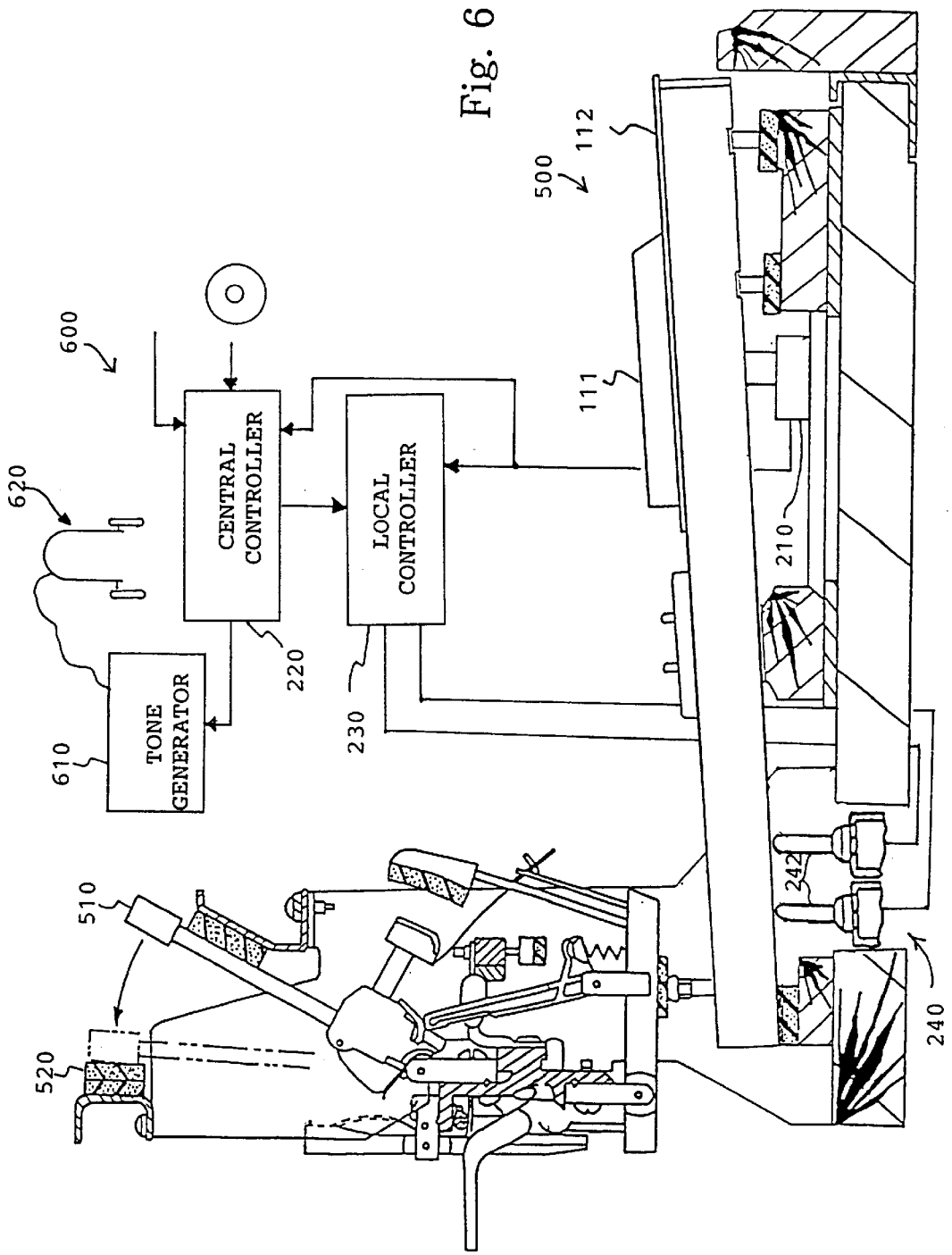
FIG. 6 is a side view showing the structure of yet another keyboard musical instrument according to the present invention.

FIG. 6 illustrates yet another keyboard musical instrument embodying the present invention. The keyboard musical instrument implementing the third embodiment comprises a training keyboard 500 and an electronic system 600. The training keyboard 500 is similar to an acoustic piano except for dummy hammers 510 and shock absorber 520. The hammer assemblies and the strings 150 are replaced with the dummy hammers 510 and the shock absorber 520, respectively. The dummy hammers 510 strikes the shock absorber 520. However, the shock absorber 520 takes up the impact, and does not generate any tone.

A tone generator 610 and a sound system 620 are incorporated in the electronic system 600. The tone generator 610 is similar to the tone generator 430, and other components are similar to those of the electronic system 200 incorporated in the second embodiment. For this reason, the components are labeled with the references designating corresponding components of the second embodiment without detailed description.

While a trainee is practicing the fingering on the training keyboard 500, the dummy hammers 510 are driven for rotation through the escape, and rebound on the shock absorber 520. The key sensors 210 monitor the associated black/white keys, and the central controller 220 produces the music data codes. The tone generator 610 produces the audio signal from the music data codes, and electronic tones are generated in the sound system 620. The electric tutor guides the trainee in fingering as similar to that of the first embodiment. The plungers 242 exactly projects until the associated black/white keys 111/112 reach the terminative points, and the key stroke is not changed after the aged deterioration, because the key sensors 210 detect the transit of the terminative points.

As will be appreciated from the foregoing description, the local controller 230 stops the plunger 242 when the associated key sensor 210 detects the transit of the terminative point. This feature is desirable, because the electric tutor clearly guides trainees in fingering regardless of the aged deterioration and the model of the keyboard.

In the first and second embodiments, the action mechanisms 120, the hammer assemblies 130 and the strings 150 as a whole constitute mechanisms. In the first to third embodiments, the solenoid-operated key actuators 240 serve as key actuators, and the plungers 242 are corresponding to moving members.

Although particular embodiments of the present invention have been shown and described, it will be apparent to those skilled in the art that various changes and modifications may be made without departing from the spirit and scope of the present invention.

The key sensor 210 may be implemented by the combination of a shutter plate and a photo-coupler. In this instance, the shutter plate is attached to the lower surface of the front portion of the associated key 111/112, and the photo-coupler produces an optical beam across the trajectory of the shutter plate. The cross section of the optical beam is elongated along the trajectory, and the trajectory is covered with the optical beam. The key position signal is produced from the photocurrent. The amount of light across the trajectory is varied depending upon the current key position, and is compared with the three threshold values representative of the three points.

A tone generator and sound system may be connected to the central controller 220 of the first embodiment. In this instance, the central controller 220 produces electronic tones on the basis of the set of music data codes. Otherwise, the central controller 220 achieves ensemble between the acoustic piano and the tone generator/sound system.

The photo-coupler of each key sensor 210 may be connected to a power supply line through a switching transistor. In this instance, the local controller supplies a control signal to the switching transistor associated with the target key.

The feedback loop according to the present invention, i.e., the combination of the key sensors 210, the local controller 230 and the solenoid-operated key actuators 240 may be applied to another kind of keyboard musical instrument such as, for example, an organ and an electric keyboard.

What is claimed is:

1. A keyboard musical instrument comprising
   a keyboard having plural keys movable between rest positions and end positions,
   plural mechanisms connected to said plural keys and selectively actuated by the keys moved from the rest positions to the end positions,
   plural key actuators having respective moving members associated with said plural keys and movable between retracted positions and projected positions for moving said plural keys from said rest positions to said end positions,
   plural key sensors associated with said plural keys for detecting transit of terminative points on the way between said rest positions and said end positions for producing detecting signals, and
   a controller connected to said plural key actuators and said plural key sensors, selectively activating said plural key actuators so as to move said moving members from said retracted position toward said projected positions and responsive to said detecting signals for stopping said moving members at intermediate positions on the way to said projected positions.

2. The keyboard musical instrument as set forth in claim 1, in which said controller is responsive to the detecting signals supplied from the key sensors associated with the keys to be moved from the rest positions to the terminative points.

3. The keyboard musical instrument as set forth in claim 1, in which each of said plural mechanisms includes an action mechanism connected to one of said plural keys and actuated by said one of said plural keys when said one of said plural keys is moved from the rest position toward the end position, a hammer driven for rotation by said action mechanism after an escape of said action mechanism, and a string struck with said hammer at an end of said free rotation.

4. The keyboard musical instrument as set forth in claim 3, in which said one of said plural keys reaches said terminative point before said escape.

5. The keyboard musical instrument as set forth in claim 3, in which the action mechanisms respectively associated with said plural keys, the hammers respectively associated with said action mechanisms and the strings respective associated with said hammers are provided over a key bed, and said plural key actuators are provided in a hollow space formed in said key bed in such a manner that said moving members are to be brought into contact with said plural keys, respectively.

6. The keyboard musical instrument as set forth in claim 5, in which said plural key actuators include respective coils wound on bobbins and said plungers retracted into and projecting from said bobbins and serving.

7. The keyboard musical instrument as set forth in claim 1, in which a set of music data codes representative of a piece of music is supplied to said controller so that said controller selectively moves said moving members from said retracted positions to said intermediate positions for guiding a human player in fingering on said plural keys.

8. The keyboard musical instrument as set forth in claim 7, in which said piece of music is played with a hand of said human player and said plural key actuators, the keys to be depressed with said hand are moved from said rest positions to said terminative points, and the remaining keys to be moved with said key actuators are moved from said rest positions toward said end positions over said terminative points.

9. The keyboard musical instrument as set forth in claim 8, in which said music data codes of said set are selectively accompanied with a first tag representative of a part to be performed with said hand and a second tag representative of another part to be performed with said plural key actuators.

10. The keyboard musical instrument as set forth in claim 9, in which said music data codes are formatted in accordance with standards of a musical instrument digital interface.

11. The keyboard musical instrument as set forth in claim 10, in which a standard of said musical instrument digital interface defines plural channels through which said music data codes are to be processed, and said first tag and said second tag are indicative of one of said plural channels and another of said plural channels.

12. A keyboard musical instrument comprising a keyboard having plural keys movable between respective rest positions and respective end positions, plural action mechanisms respectively linked with said plural keys and selectively actuated by the associated keys moved from the rest positions toward the end positions, plural hammers respectively linked with said plural action mechanisms and driven for free rotation by the associated action mechanisms after escape of said associated action mechanisms therefrom, plural sets of strings struck with said plural hammers at an end of said free rotation for producing tones, an electronic system including plural key actuators having respective moving members respectively associated with said plural keys and selectively energized for moving said moving members from respective retracted positions toward respective projected positions, thereby moving said plural keys from said rest positions toward said end positions, plural key sensors respectively associated with said plural keys and detecting said associated keys in reaching terminative positions on the way from said rest positions to said end positions for producing detecting signals and a controller supplied with pieces of music data information representative of keys to be moved for guiding a human trainee in fingering on said keyboard, selectively energizing said plural key actuators in accordance with said pieces of music data information and responsive to said detecting signals so as to stop the moving members at intermediate positions on the way to said projected positions.

13. The keyboard musical instrument as set forth in claim 12, in which said pieces of music data information are contained in a set of music data codes representative of a tune to be performed.

14. The keyboard musical instrument as set forth in claim 13, in which said tune is played with a hand of said human trainee and said plural key actuators, the keys to be depressed with said hand are moved from said rest positions to said terminative positions, and the remaining keys to be moved with said plural key actuators are moved from said rest positions toward said end positions over said terminative positions.

15. The keyboard musical instrument as set forth in claim 14, in which said music data codes of said set are selectively accompanied with a first tag representative of a part to be performed with said hand and a second tag representative of another part to be performed with said plural key actuators.

16. The keyboard musical instrument as set forth in claim 15, in which said music data codes are formatted in accordance with standards of a musical instrument digital interface.

17. The keyboard musical instrument as set forth in claim 16, in which a standard of said musical instrument digital interface defines plural channels through which said music data codes are to be processed, and said first tag and said second tag are indicative of one of said plural channels and another of said plural channels.

* * * * *